United States Patent [19]

Wilhelm et al.

[11] Patent Number: 5,665,851

[45] Date of Patent: Sep. 9, 1997

[54] AMINOPLASTIC RESINS AND THEIR USE AS A CROSSLINKING AGENT FOR CELLULOSE

[75] Inventors: Didier Wilhelm, Issy-les-Moulineaux; Alain Blanc, Saint-Denis, both of France; William C. Floyd, Chester, S.C.

[73] Assignee: Sequa Chemicals, Inc., Chester, S.C.

[21] Appl. No.: 517,568

[22] Filed: Aug. 21, 1995

[30] Foreign Application Priority Data

Aug. 22, 1994 [FR] France .................................. 94 10186

[51] Int. Cl.$^6$ .......................... C08G 12/08; C08G 12/30; C08G 12/32

[52] U.S. Cl. .......................... 528/230; 528/243; 528/245; 528/509; 528/511; 521/87; 521/94

[58] Field of Search .................................. 528/230, 243, 528/245; 525/509, 511; 521/87, 94

[56] References Cited

U.S. PATENT DOCUMENTS

| | | |
|---|---|---|
| 4,455,416 | 6/1984 | Floyd et al. . |
| 5,055,113 | 10/1991 | Larson et al. .......................... 51/298 |

FOREIGN PATENT DOCUMENTS

| | | |
|---|---|---|
| 0 381 905 | 8/1990 | European Pat. Off. . |
| WO 93/14261 | 7/1993 | WIPO . |

*Primary Examiner*—James J. Seidleck
*Assistant Examiner*—Duc Truong
*Attorney, Agent, or Firm*—Mitchell D. Bittman

[57] ABSTRACT

Aminoplastic resin based on one or more amino derivatives and one or more aldehydes in which the amino derivative is melamine, glycoluril or their mixture in variable proportions and that the aldehyde is a product of formula (I) R—CHO where R=a dialkoxymethyl, 1,3-dioxolan 2-yl group optionally substituted on the vertex 4 and/or 5 by one or more alkyl groups or a 1,3-dioxan 2-yl group optionally substituted on vertices 4, 5 and/or 6 by one or more alkyl groups, optionally mixed with glyoxal, preparation process and use as a crosslinking agent for cellulose.

22 Claims, No Drawings

AMINOPLASTIC RESINS AND THEIR USE AS A CROSSLINKING AGENT FOR CELLULOSE

The present invention relates to new aminoplastic resins and their use as crosslinking agents for cellulose.

A large number of aminoplastic resins are known in which the amino derivative is urea or melamine, and the aldehyde derivative is formaldehyde or glyoxal. (cf. in particular in Encyclopedia of Polymer Science and Engineering, 2nd edition, volume 1, pages 752–789, John Wiley and Sons, New York, 1985). These resins have a very large number of uses and in particular they can be used for finishing cellulose fibres by giving on "wash and wear" properties. In the textile or paper industries, men skilled in the art are constantly seeking reactive aminoplastic resins which permit good crosslinking of the cellulose fibres, an excellent remanence to household washings. In attempting to resolve this problem, the Applicant has discovered with astonishment new aminoplastic resins containing aldehyde groups transitorily blocked in the acetal state.

Therefore a subject of the present invention is aminoplastic resins based on one or more amino derivatives and one or more aldehydes, characterized in that the amino derivative is melamine, glycoluril or their mixture in variable proportions and that the aldehyde is a product of formula (I)

R—CHO     (I)

which will be designated "glyoxal monoacetal", in which R represents a dialkoxymethyl group, 1,3-dioxolan 2-yl group optionally substituted on vertex 4 and/or 5 by one or more alkyl groups or a 1,3-dioxan 2-yl group optionally substituted on vertices 4, 5 and or 6 by one or more alkyl groups, optionally mixed with glyoxal.

The term alkoxy can designate for example a methoxyl, ethoxyl, n-propoxyl 1-methoxy ethoxy, n-butoxyl, 2-methyl propoxyl radical.

The term alkyl can designate for example a methyl, ethyl, n-propyl, 1-methyl ethyl, n-butyl, 2-methyl propyl radical.

A more particular subject of the invention is the aminoplastic resins as defined above, characterized in that the product of formula (I) is dimethoxyacetaldehyde, diethoxyacetaldehyde, dibutoxyacetaldehyde, 2-formyl 1,3-dioxolane or 5,5-dimethyl 2-formyl 1,3-dioxane optionally mixed with glyoxal.

Among these last-named resins, a particular subject of the invention is the resins characterized in that the amino derivative is either melamine or glycoluril, and that the aldehyde is dimethoxyacetaldehyde, diethoxyacetaldehyde, dibutoxyacetaldehyde or dibutoxyacetaldehyde,

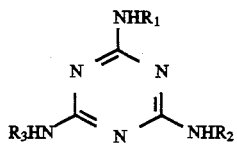

(II)

in which $R_1$ represents a radical of formula (III)

—CH(OH)—CH(OR')$_2$     (III)

where R' represents a methyl or butyl radical, $R_2$ and $R_3$ being identical or different represent a hydrogen atom or an $R_1$ radical.

Among these last-named products, a particular subject of the invention is:

2-(2',2'-dimethoxy 1'-hydroxy ethylamino) 4,6-diamino s-triazine, 2-(2',2'-dibutoxy 1'-hydroxy ethylamino) 4,6-diamino s-triazine, 2,4-bis(2',2'-dimethoxy 1'-hydroxy ethylamino) 6-amino s-triazine, 2,4-bis(2',2'-dibutoxy 1'-hydroxy ethylamino) 6-amino s-triazine, 2,4,6-tris(2',2'-dimethoxy 1'-hydroxy ethylamino)s-triazine, 2,4,6-tris(2',2'-dibutoxy 1'-hydroxy ethylamino)s-triazine.

According to the invention, the resins of the invention can be prepared by a process characterized in that a molar quantity of an aldehyde of formula (I) optionally mixed with glyoxal is reacted, in an aqueous medium, at a pH of greater than 6, with either melamine, or glycoluril, or a mixture of glycoluril and melamine in order to obtain the desired degree of substitution, then the resin obtained is isolated using processes known per se.

Under the preferred conditions for implementing the invention, the process described above is carried out in the following manner:

at a temperature comprised between 30° and 120° C., in an aqueous medium in the optional presence of a third solvent miscible with water such as an alkanol which is inert vis-à-vis the reaction, in the optional presence of a catalyst such as an alkaline agent (for example sodium hydroxide, potassium hydroxide), by using the aldehyde of formula (I) in a crude reaction solution such as that obtained using the process described in FR-A-2,599,362.

In the case where the amino derivative is melamine, up to 6 moles of the aldehyde of formula (I) can be used per mole of melamine employed in order to obtain the desired degree of substitution of the amino group. In the case where the amino derivative is glycoluril, up to 4 moles of the aldehyde of formula (I) can be used so as to obtain complete substitution of the amino groups. In the case where the amino derivative is a mixture of melamine and glycoluril, a molar quantity of the aldehyde of formula (I) will be used in order to obtain the desired number of N—CH)OH)—R groups on the amino derivatives where R has the meaning given previously. In order to obtain the resins according to the invention, it is sufficient to eliminate the reaction solvent or solvents at the end of the reaction in order to obtain the desired resin with an excellent yield, however, as a general rule, it is preferable to use directly the crude reaction medium or the crude reaction medium, concentrated under reduced pressure until a desired dry extract is obtained, determined by drying a sample for 3 hours at 105° C.

According to a variant of the invention, the resins described above can be aged in a natural or accelerated fashion. Ageing the resins described above allows more reactive aminoplastic resins to be obtained, which may be useful in certain applications.

Therefore a subject of the present invention is also aminoplastic resins based on melamine and/or glycoluril and a glyoxal monoacetal and optionally glyoxal, which will have been aged in a spontaneous or accelerated fashion.

For the spontaneous ageing of the resins as described above, they are stored in a room at ambient temperature, in a closed receptacle, the consequence of which is an increase in the viscosity of these resins.

The increase in viscosity is a function of the duration and conditions (pH, temperature, concentration) of ageing.

If one takes the example of a melamine/dimethoxyethanal ⅓ resin having a 54% concentration of active ingredient and a viscosity of about 50 mPa.s, storage for one year at 25° C., in a sealed flask, allows an aged resin to be obtained having a viscosity comprised between 200 and 300 mPa.s.

So as to allow a more rapid use of these resins, an accelerated ageing can be carried out on the aminoplastic resins described above.

In order to achieve this, the resin in an aqueous solution is subjected to the following treatment:
adjusting the pH to an acid or neutral value,
heating the solution.

For example, if it is desired to produce the ageing over a time span of less than about ten hours whilst retaining control over the development of the reaction, the pH is adjusted to a value comprised between 3 and 8, preferably between 5 and 7.5. The operation will take place at a temperature greater than 80° C., for 1 to 10 hours.

Such reaction conditions allow monitoring of the development of viscosity. By using simple tests, a man skilled in the art will be able to choose the conditions which best suit the starting resin.

Proton NMR analysis of these resins allows the observation that the chemical shifts of the protons are the same for the aged resins and the starting resins. However, it is noted that in the spectra of the aged resins there is a broadening of the peaks which allows the affirmation that oligomers of the starting products are formed during the ageing process, which confirms the increase in viscosity.

Finally, these aged resins will be able to be prepared in a single stage starting with melamine and/or glycoluril and glyoxal monoacetal, and optionally glyoxal, by a process characterized in that an acid solution is optionally added to the amine and aldehyde mixture in an aqueous solution to adjust the pH to a value comprised between 3 and 8, preferably between 5.0 and 7.5, and the mixture is taken to a temperature greater than 30° C. Preferably, the operation will be carried out at a temperature greater than 80° C., for 1 to 10 hours.

In the same way as in the method described above, a man skilled in the art will adjust the parameters as a function of his starting product and the degree of ageing which he wishes to obtain.

According to another variant of the invention, the aminoplastic resins described above can be partially or totally etherified using alcohols, in particular using methanol. More particularly, resins based on melamine and glyoxal monoacetals can be mentioned which are etherified with methanol, of formula (IV)

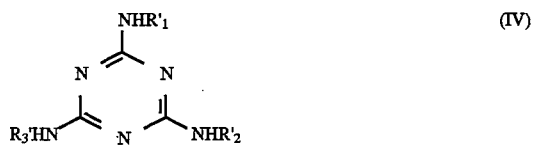

(IV)

in which $R'_1$, $R'_2$, $R'_3$, identical or different, represent
either a hydrogen atom,
or a radical of formula (V)

(V)

where R has the same meaning as in formula (I)
or a radical of formula (VI)

(VI)

R having the same meaning as in formula (I), and R" designating a $C_1$–$C_4$ alkyl radical, preferably a methyl radical, at least one of $R'_1$, $R'_2$, $R'_3$ being different from a hydrogen atom.

These resins can be obtained by a process consisting of treating the starting aminoplastic resins with an alcohol in an acid or neutral medium.

In a preferred fashion, the aqueous solution of aminoplastic resin will be concentrated in order to encourage the etherification reaction.

For example, the starting aminoplastic resin, based on melamine, can be treated with methanol in a medium adjusted to a pH comprised between 2 and 7, preferably between 4 and 5, by taking the medium to a temperature comprised between 40° and 65° C. $R'_1$, $R'_2$, $R'_3$, The products of formula (I) are either commercial products, or products which are accessible through known processes such as the process described in FR-A-2,599,362.

The resins of the invention, which have no free or combined formaldehyde, have useful properties for the crosslinking of cellulose. These properties justify their use as a crosslinking agent for cellulose, and they are even more interesting in that they allow the crosslinking of cellulose in the absence of free or combined formaldehyde.

Finally, a subject of the present invention is a crosslinking method for cellulose characterized in that a cellulose fibber, in particular a fabric based on cellulose fibres, is reacted with a sufficient quantity of an aminoplastic resin as defined above.

EXAMPLE 1

The following are mixed together under agitation at ambient temperature:

163.8 g (1.3 mole) of melamine, 734.2 g (3.9 mole) of dibutoxyethanal, 897 g of a water-2-propanol mixture, 1/1 by volume, a sufficient quantity of soda at 30% by weight in order to obtain a pH of about 9.

This mixture is heated for 4 hours at boiling point, under agitation, while maintaining the pH at about 9 by the addition, if necessary, of a few drops of soda at 30% by weight. At the end of the reaction, a solution is obtained which is concentrated under reduced pressure. In this way 850 g of a viscous oil is obtained which slowly starts to solidify. A 0.709 g sample of this oil is purified by chromatography on silica with elution with a dichloromethane-methanol mixture 9/1 by volume. In this way 5 fractions are separated, with a yield of 91%, designated A1–A5 which are then analyzed by proton and carbon 13 NMR in solution in DMSO $d_6$. The chemical shifts (dppm) of the carbon atoms of the mono-, di- and tricondensation products (CI–CIII) are given in Table 1 as well as the composition by weight of the various fractions A1–A5 (Table II).

TABLE 1

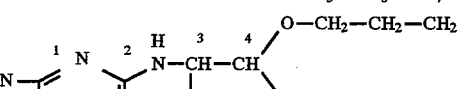

| | $C_1$ | $C_2$ | $C_3$ | $C_4$ | $C_{5,5'}$ | $C_{6,6'}$ | $C_{7,7'}$ | $C_{8,8'}$ |
|---|---|---|---|---|---|---|---|---|
| Melamine | 167.5 | | | | | | | |
| CI | 167.5 | 167.2 | 74.1 | 102.6 | 66.5 66.2 | 31.5 | 18.8 | 13.6 |

For the dicondensation product (CII), the chemical shifts of the carbon atoms of the ring are 167 ppm (C—$NH_2$) and 166 ppm for the two other carbon atoms respectively. For tricondensation product (CIII), the chemical shifts of the carbon atoms of the ring are 165.3 ppm. For both CII and for CIII, the chemical shifts of the carbon atoms of the chains ($C_3$–$C_8$ and $C_5$–$C_8$) are identical to those of CI.

TABLE II

| Fractions | Weight (g) | Mel. | DBE | $C_I$ | $C_{II}$ | $C_{III}$ |
|---|---|---|---|---|---|---|
| A1 | 0.210 | | t | | | >>100 |
| A2 | 0.236 | | t | | 25 | 75 |
| A3 | 0.078 | | t | | 72 | 28 |
| A4 | 0.083 | 8 | | 28 | 44 | 20 |
| A5 | 0.037 | | | 60 | 40 | |

Mel.: melamine
DBE: dibutoxyethanal
t: non dosed
$C_I$: 2-(2',2'-dibutoxy 1'-hydroxy ethylamino) 4,6-diamino s-triazine
$C_{II}$: 2,4-bis(2',2'-dibutoxy 1'-hydroxy ethylamino) 6-amino s-triazine
$C_{III}$: 2,4,6-tris(2',2'-dibutoxy 1'-hydroxy ethylamino) s-triazine

EXAMPLE 2

The following are mixed together under agitation at ambient temperature:

12.6 g (0.1 mole) of melamine, 31.2 g (0.3 mole) of dimethoxyethanal in solution in 31.2 g of water, a sufficient quantity of soda at 30% by weight in order to obtain a pH of about 9.

This mixture is then heated under agitation for 2 hours at 60° C. while maintaining the pH at about 9 by adding, if necessary, a few drops of soda at 30% by weight.

The reaction solution is then concentrated under reduced pressure. In this way about 43.8 g of an oil is obtained designated H2 containing traces of melamine and mono-, di- and tricondensation products the carbon atom chemical shifts (dppm) of which (carbon 13 NMR is solution in DMSO $d_6$) are given in Table III.

TABLE III

| | $C_1$ | $C_2$ | $C_3$ | $C_4$ | $C_{5,5'}$ |
|---|---|---|---|---|---|
| Melamine | 167.5 | | | | |
| B | 167.4 | 167.1 | 73.6 | 104.7 | 54.7 54.0 |
| $B_2$ | 167 | 166 | 73.6 | 104.7 | 54.7 54.0 |
| $B_3$ | — | 165.2 | 73.6 | 104.4 | 54.7 54.0 |

$B_2$: 2,4-bis(2',2'-dimethoxy 1'-hydroxy ethylamino) 6-amino s-triazine
$B_3$: 2,4,6-tris(2',2'-dimethoxy 1'-hydroxy ethylamino) s-triazine For product $B_2$, the carbon atom designated $C_1$ is the carbon atom which carries the amino group.

EXAMPLE 3

The following are mixed together under agitation at ambient temperature:

252 g (2 moles) of melamine, 58 g (1 mole) of glyoxal in aqueous solution at 40% by weight, 416 g (4 moles) of dimethoxyacetaldehyde in solution in 416 g of water, a sufficient quantity of soda at 30% by weight in order to obtain a pH of about 7.

This mixture is heated under agitation for 2 hours at 60° C. while maintaining the pH at about 7 by the addition, if necessary, of a few drops of soda at 30% by weight.

In this way about 1,230 g of an aqueous solution is obtained containing about 727 g of an aminoplastic resin according to the invention.

Carbon 13 NMR analysis of a sample of this resin shows that, on the one hand, the melamine molecules are substituted by —NH—CH(OH)—CH(OMe)$_2$ groups, and on the other hand, that probably two melamine molecules are linked by a bridge: —NH—CH(OH)—CH(OH)—NH—.

EXAMPLE 4

The following mixture is heated for two hours at 60° C. under agitation and while maintaining the pH of the reaction medium at 9 by the addition of 5N soda:

546 g (5.25 moles) of dimethoxyethanal in solution in 364 g of distilled water, 248.5 (1.75 mole) of glycoluril, 290 g of distilled water.

The dissolution of the glycoluril is observed after heating for 90 minutes. After cooling down the reaction solution to ambient temperature, 1,472 g of an aqueous solution is obtained containing about 54% of resin according to the invention. $^{13}$C NMR analysis of a sample of this resin in DMSO $d_6$ corresponds with the expected structure:

162–157 ppm (C═O); 103–104 ppm

75 ppm (CHOH);

65–62 ppm (C—H); 56–54 ppm (OCH$_3$).

EXAMPLES 5 TO 8

The aminoplastic resin prepared in Example 2 is diluted to 54% of active ingredient by the addition of 6 g of water. A resin is obtained having a viscosity of about 5 mPa.s.

The pH of this solution is adjusted to an initial pHi value at ambient temperature, by the addition of a 20% aqueous solution of sulphuric acid, the temperature of the medium is taken to a temperature T, under agitation, for a period of time t.

A resin Rn is obtained (n=5,6,7,8) the Brookfield viscosity η of which is measured in mPa.s.

By analysis using high performance liquid chromatography (HPLC) the surface area of the products contained in the starting resin is measured. This measurement is taken before the reaction (Ai) and after the reaction (ai) under identical conditions of elution, detection and concentration.

The degree of condensation of the components of the resin during the ageing process is calculated:

$$\frac{\Sigma Ai - \Sigma ai}{\Sigma Ai} \times 100$$

| Resin | Reaction parameters | | | | % condensation |
|---|---|---|---|---|---|
| | η | pHi | t | T | |
| R5 | 288 | 7.3 | 7 h 30 | 95° | 83% |
| R6 | 272 | 6.5 | 7 h 30 | 95° | 82% |
| R7 | 368 | 6.0 | 5 h 30 | 95° | 82% |
| R8 | 752 | 5.5 | 2 h 30 | 95° | 89% |

EXAMPLE 9

The following are introduced in to a flask:

12.6 g (0.1 mole) of melamine, 31.2 g (0.3 mole) of dimethoxyethanal in solution in 37.2 g of water.

At ambient temperature the pH of the solution is adjusted to 5.6 using sulphuric acid in aqueous solution at 20% and the reaction medium is taken to 95° C. for 3 hours 30 minutes. A resin is obtained with a Brookfield viscosity of 230 mPa.s, with an active ingredient content of 54%.

EXAMPLE 10

A resin is prepared according to Example 2 starting from:

291.4 g (2.31 moles) of melamine, 721.6 g (6.9 moles) of dimethoxyethanal in aqueous solution at 50%.

The resin is then concentrated to 76.4% of active ingredient by evaporation under reduced pressure.

1,606 g of methanol is added to this concentrated resin, then the pH is adjusted to 4 by the addition of sulphuric acid in aqueous solution at 50%. The reaction medium is taken to 50° C., then after 30 minutes under agitation the medium is adjusted to pH=6 by the addition of an aqueous solution of concentrated soda at 47%.

The excess methanol is evaporated off under reduced pressure and 1,435 g of a white suspension is obtained which is diluted by the addition of 197.9 g of distilled water.

After filtration through sintered glass 1,170 g of etherified resin is collected having a Brookfield viscosity of about 140 mPa.s.

We claim:

1. Aminoplastic resin based on one or more amino derivatives and one or more aldehydes, characterized in that the amino derivative is melamine, glycoluril or their mixture in variable proportions and that the aldehyde is a product of formula (I)

R—CHO    (I)

in which R represents a dialkoxymethyl group, 1,3-dioxolan 2-yl group optionally substituted on the vertex 4 and/or 5 by one or more alkyl groups or a 1,3-dioxan 2-yl group optionally substituted on the vertices 4, 5 and/or 6 by one or more alkyl groups, optionally mixed with glyoxal.

2. Resin according to claim 1, characterized in that the product of formula (I) is dimethoxyacetaldehyde, diethoxyacetaldehyde, dibutoxyacetaldehyde, 2-formyl 1,3-dioxolane or 5,5-dimethyl 2-formyl 1,3-dioxane optionally mixed with glyoxal.

3. Resin according to claim 1, characterized in that the amino derivative is either melamine, or glycoluril, and that the aldehyde is dimethoxyacetaldehyde, diethoxyacetaldehyde, dibutoxyacetaldehyde optionally mixed with glyoxal.

4. Resin according to claim 1 of formula (II)

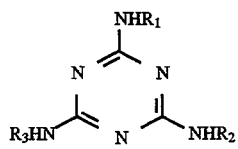

in which $R_1$ represents a radical of formula (III)

—CH(OH)—CH(OR')$_2$    (III)

where R' represents a methyl or butyl radical, $R_2$ and $R_3$ identical or different represent a hydrogen atom or an $R_1$ radical.

5. Resin according to claim 1, characterized in that it is 2-(2',2'-dimethoxy 1'-hydroxy ethylamino) 4,6-diamino s-triazine.

6. Resin according to claim 1, characterized in that it is 2-(2',2'-dibutoxy 1'-hydroxy ethylamino) 4,6-diamino s-triazine.

7. Resin according to claim 1, characterized in that it is 2,4-bis(2',2'-dimethoxy 1'-hydroxy ethylamino) 6-diamino s-triazine.

8. Resin according to claim 1, characterized in that it is 2,4-bis(2',2'-dibutoxy 1'-hydroxy ethylamino) 6-diamino s-triazine.

9. Resin according to claim 1, characterized in that it is 2,4,6-tris(2',2'-dimethoxy 1'-hydroxy ethylamino) s-triazine.

10. Resin according to claim 1, characterized in that it is 2,4,6-tris(2',2'-dibutoxy 1'-hydroxy ethylamino) s-triazine.

11. Preparation for a resin according to claim 1, characterized in that a molar quantity of an aldehyde of formula (I), optionally mixed with glyoxal, is reacted, in an aqueous medium, at a pH of greater than 6, with either melamine, or glycoluril or a mixture of glycoluril and melamine in order to obtain the desired degree of substitution, then in that the resin obtained is isolated.

12. Preparation process according to claim 11, characterized in that it is carried out at a temperature comprised between 30 and 120° C.

13. Preparation process according to claim 11, characterized in that it is carried out in the presence of an alkaline catalyst.

14. Preparation process according to claim 13, characterized in that the alkaline catalyst is sodium hydroxide.

15. Aminoplastic resin according to claim 1, having an oligomeric form.

16. Aminoplastic resin according to claim 15, wherein said oligomeric form is achieved by ageing which comprises adjusting the pH of a starting solution of said resin to an acid or neutral value and heating said solution.

17. Ageing process for an aminoplastic resin according to claim 1, characterized in that the pH of the starting resin solution is adjusted to a value comprised between 3 and 8 and that the solution is taken to a temperature greater than 30° C. for 1 to 10 hours.

18. Aminoplastic resin characterized in that it is obtained by applying the process according to claim 17 to a solution of melamine and/or glycoluril, an aldehyde of Formula (I) and glyoxal monoacetal and optionally glyoxal.

19. Aminoplastic resin based on the oligomers of the products according to claim 1.

20. Resin according to formula (IV)

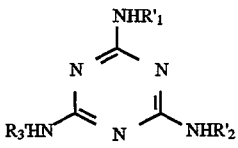

in which $R'_1$, $R'_2$, $R'_3$, identical or different, represent either a hydrogen atom, or a radical of formula (V)

—CH(OH)—R    (V)

where R has the same meaning as in formula (I)

or a radical of formula (VI)

—CH(OR")—R    (VI)

R having the same meaning as in formula (I), and R" designating a $C_1$–$C_4$ alkyl radical, at least one of $R'_1$, $R'_2$, $R'_3$ being different from the hydrogen atom.

21. A process for preparing an aminoplastic resin according to formula (IV)

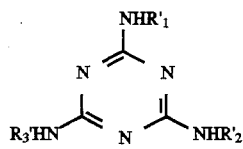 (IV)

in which $R'_1$, $R'_2$, $R'_3$, identical or different, represent
either a hydrogen atom,
or a radical of formula (V)

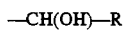 (V)

where R has the same meaning as in formula (I)
or a radical of formula (VI)

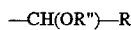 (VI)

R having the same meaning as in formula (I), and R" designating a $C_1$–$C_4$ alkyl radical, at least one of $R'_1$, $R'_2$, $R'_3$ being different from the hydrogen atom, comprising: treating an aminoplastic resin in accordance with claim 1 with an alcohol in an acid or neutral medium.

22. In a method of crosslinking cellulose using an aminoplastic resin, the improvement wherein said aminoplastic resin is one in accordance with claim 1.

* * * * *